J. L. JOHNSON.
SYSTEM OF ELECTRICAL DISTRIBUTION.
APPLICATION FILED SEPT. 16, 1910.
1,132,478.
Patented Mar. 16, 1915.
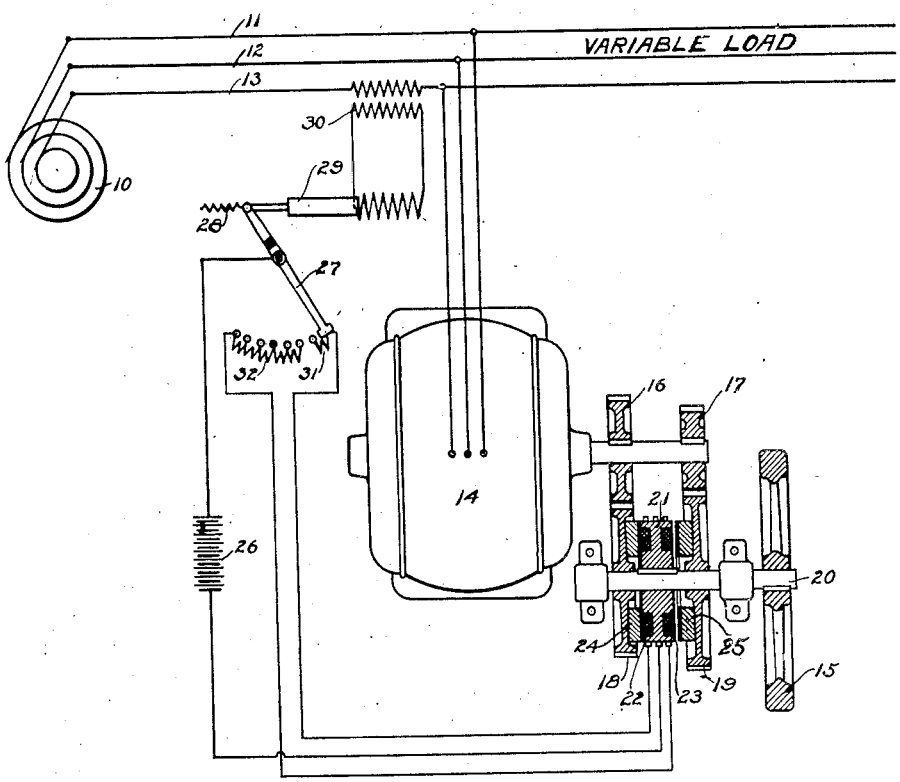
Witnesses
Rob. E. Stoll.
Chas. L. Byron.
Inventor
John L. Johnson
By Chas. E. Lord
Attorney

UNITED STATES PATENT OFFICE.

JOHN L. JOHNSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF ELECTRICAL DISTRIBUTION.

1,132,478.     Specification of Letters Patent.     Patented Mar. 16, 1915.

Application filed September 16, 1910. Serial No. 582,302.

*To all whom it may concern:*

Be it known that I, JOHN L. JOHNSON, a citizen of the United States, residing at Milwaukee, in the county of Milwaukee and State of Wisconsin, have invented certain new and useful Improvements in Systems of Electrical Distribution, of which the following is a full, clear, and exact specification.

My invention relates to systems of electrical distribution.

In many electrical systems, there is a fluctuation of the load between very wide limits, the upper limit often exceeding the capacity of the generator supplying the system. In systems of this sort it has been proposed to connect across the line a dynamo-electric machine whose rotating member has large inertia, which machine acts as a motor to store up kinetic energy when the load on the line is light and as a generator driven by such stored energy when the load on the line is heavy.

It is the object of my present invention to obtain in a system of this sort a simple and reliable arrangement by which the storing and giving up of the kinetic energy may be more readily and accurately controlled.

In attaining this object I employ means whereby the relation between the speed of the dynamo-electric unit and the speed at which the fly-wheel is rotating is varied, preferably under the control of the load on the circuit. The invention is preferably used in connection with alternating current systems, though its use is not limited to such systems.

Specifically considered, the invention comprises a dynamo-electric machine and sets of gearing of different ratios for connecting a fly-wheel to said dynamo-electric machine. The speed at which the fly-wheel normally runs is that resulting from the operation of that set of gearing which if driven by the dynamo-electric machine would give the fly-wheel its maximum speed, and one or the other of the sets of gearing is rendered operative according as the load on the circuit is light or heavy. When the load is light the gearing which if driven by the dynamo-electric machine would give the fly-wheel the maximum speed, is effective, and the dynamo-electric machine acts as a motor to store up kinetic energy in the fly-wheel. When the load is heavy, the gearing which if driven by the dynamo-electric machine would give the fly-wheel the lower speed, is effective, and the energy stored in the fly-wheel is given up to drive the dynamo-electric machine as a generator to cause it to supply energy to the circuit. The rate at which the dynamo-electric machine supplies energy to the line may be adjustable, but preferably the whole operation is automatically controlled.

The various novel features of my invention will be described in the specification and particularly set forth in the claims.

The single figure of the drawing shows diagrammatically one embodiment of my invention.

The generator 10 supplies the distribution circuit 11—12—13 on which there is a load which fluctuates quite rapidly within wide limits. The load may be of any character. The invention is especially applicable to those cases where the variable load is a power load, consisting, for instance, of one or more rolling mill motors. The generator as here shown is a three phase generator, but my invention in its broader aspects is not limited to three phase systems. Across the circuit 11—12—13 is connected a dynamo-electric machine whose rotating member has large inertia, as by being geared to a fly-wheel 15. This dynamo-electric machine is arranged to act as a motor to store up energy in the fly-wheel when the load on the circuit 11—12—13 is light and as a generator driven by the energy of the fly-wheel to supply current to the circuit 11—12—13 when the load on such circuit is heavy. The arrangement for controlling the consumption and production of energy by the dynamo-electric machine and fly-wheel is the essence of my present invention.

In the arrangement shown the dynamo-electric machine consists of an induction motor 14 of the squirrel cage type, having a single synchronous speed. Mounted upon the shaft of the motor 14 are two spur gears 16 and 17, coöperating with two gears 18 and 19 respectively mounted loosely upon a counter shaft 20 to which the fly-wheel 15 is secured. Keyed to the shaft 20 is a magnetic clutch member 21 having two windings 22 and 23 which attract the armatures 24 and 25 respectively secured to the gears 18 and 19 respectively. The magnetic clutch 21 is energized by any suitable source of current, as a storage battery 26 and either of the windings 22 or 23 may be rendered effective by means of a switch 27. The switch 27 is biased, as by a spring 28, to the position in which it completes the circuit of the winding 22, but it may be moved to the other position to energize the winding 23 by means of a solenoid 29 connected to a transformer 30 and controlled in response to the current in the supply circuit.

The motor 14 may be started in any desired manner. When the load on the circuit 11—12—13 is below a predetermined value, the switch 27 is in the position shown and the winding 22 is energized. This attracts the armature 24 which is secured to the gear 18 and forms a driving connection between the gear 18 and the shaft 20. The gears 16 and 17 secured to the shaft of the motor 14 are of different diameters, the gear 16 which meshes with the gear 18 being of larger diameter than the gear 17. If the driving connection is made through the gear 16 to the shaft of the fly-wheel 15 the speed ratio between the speed of the motor 14 and the fly-wheel 15 will be greater than if the fly-wheel were driven through the gear 17. With the clutch in the position shown, the fly-wheel is rotating at its maximum speed. When the load on the circuit increases and the current supplied by the generator 10 exceeds the value for which the switch 27 is set, said switch is moved to the left and the clutch winding 23 becomes energized and forms a driving connection between the gear 17 and the shaft 20 of the fly-wheel 15. Before this change in the driving connections, the fly-wheel is rotating at maximum speed and the speed ratio between the motor and the fly-wheel is at its maximum. After this change the speed ratio between the motor and the fly-wheel is lowered, and, due to the large inertia of the fly-wheel 15, the speed of the motor 14 is increased. In consequence of this change of speed ratio the actual speed of the motor 14 is increased above its synchronous speed and the motor 14 driven by the energy in the fly-wheel 15 supplies energy to the circuit 11—12—13. As soon as the load on the circuit 11—12—13 drops and the current supplied by the generator 10 becomes less than that for which the switch 27 is set, said switch is allowed to move back to its original position and to deënergize the winding 23 and to energize the winding 22. The motor is now allowed to run at its synchronous speed and to accelerate the fly-wheel. Two resistances 31 and 32 are included in the circuit of the windings 22 and 23 respectively. These resistances are controlled by the switch 27 and allow a certain amount of slip in the driving connection between the motor 14 and the fly-wheel 15, the amount of slip being regulated by the amount of resistance in circuit.

If the load on the circuit 11—12—13 is slightly above the value for which the spring 28 is set the switch 27 allows a large part of the resistance 32 to remain in the circuit of the winding 23 and the slip between the driving connection of the motor 14 and the fly-wheel 15 is very large. This results in only a slight increase in the speed of the motor 14 above synchronism. If the load on the circuit 11—12—13 is large all of the resistance 32 is cut out of circuit and the slip of the driving connection is greatly decreased. This results in the motor 14 being driven at its maximum speed above synchronism and in a great deal of current being supplied to the line.

One specific embodiment of my invention has been described, but the invention is not limited to it. Many other arrangements may be used for driving the fly-wheel and for varying the relative speeds between the motor and the fly-wheel. Other arrangements may also be used for regulating the amount of current returned to the line. I aim in my claims to cover all such modifications which do not depart from the spirit and scope of my invention.

What I claim as new is:

1. In combination, a generator, a variable load circuit supplied thereby, a dynamo-electric machine connected across said circuit, a fly-wheel, and a device for connecting said fly-wheel to said dynamo-electric machine and for changing the speed ratio of said fly-wheel to said dynamo-electric machine when the load on said circuit varies.

2. In combination, a generator, a variable load circuit supplied thereby, a dynamo-electric machine connected across said circuit, a fly-wheel, and a device for connecting said fly-wheel to said dynamo-electric machine and for changing the speed ratio of said fly-wheel to said dynamo-electric machine when the load on said circuit falls below a predetermined value.

3. In combination, a generator, an electric circuit supplied thereby and carrying a variable load, a dynamo-electric machine connected across said circuit, a fly-wheel, and a device for connecting said fly-wheel to said dynamo-electric machine, and for lowering the speed ratio of said fly-wheel to said dynamo-electric machine when the load on said circuit is above a predetermined value.

4. In combination, a generator, a variable load circuit supplied thereby, a dynamo-electric machine connected across said circuit, a fly-wheel, and a device for connecting said fly-wheel to said dynamo-electric machine, and for increasing the speed ratio of said fly-wheel to said dynamo-electric machine when the load on said circuit falls below a predetermined value.

5. In combination, a generator, a circuit supplied thereby, a dynamo-electric machine connected across said circuit, a fly-wheel, and a device for connecting said fly-wheel to said dynamo-electric machine and for varying the speed ratio of said fly-wheel to said dynamo-electric machine, and means responsive to the load on said circuit for controlling said device.

6. In combination, an alternating current circuit, an induction motor connected across said circuit, the rotating member of said motor being connected to a member of great inertia, and means responsive to the actual speed of said circuit for raising the actual speed of said motor relatively to the synchronous speed thereof when the load on the circuit rises above a predetermined value.

7. In combination, an alternating current generator, an alternating current circuit supplied thereby, an induction motor connected across said circuit a member of great inertia connected to the rotating member of said motor, and means responsive to the current supplied by said generator for varying the speed of the motor relatively to its synchronous speed in the same sense as the current supplied by said generator varies relatively to a predetermined value.

8. In combination, an alternating current circuit, an induction motor connected across said circuit, a member of comparatively great inertia connected to the rotor of said motor, and means for varying the actual speed of said motor between an approximately synchronous value and a value in excess of synchronism.

9. In combination, a generator, an electric circuit supplied thereby and carrying a variable load, an induction motor connected across said circuit, a fly-wheel, high and low speed transmissions for connecting said motor to said fly-wheel, a magnetic clutch for rendering either of said transmissions operative, and means controlled by the load on said circuit for operating said clutch.

10. In combination, a generator, an electric circuit supplied thereby and carrying a variable load, a dynamo-electric machine connected across said circuit, a fly-wheel, means including a magnetic clutch and responsive to the load on said circuit for causing said dynamo-electric machine to act as a motor to store up energy in said fly-wheel when the load on said circuit is light, and for causing said fly-wheel to drive said dynamo-electric machine as a generator to return energy to the circuit in an amount varying with the value of the load above normal when the load on said circuit is heavy.

11. In combination, a generator, an electric circuit supplied thereby and carrying a variable load, an induction motor connected across said circuit, a fly-wheel, high and low speed transmissions for connecting said motor to said fly-wheel, a magnetic clutch for rendering either of said transmissions operative, and means controlled by the load on said circuit for gradually rendering said clutch completely effective.

12. In combination, an alternating current circuit, an induction motor connected across said circuit, a member of comparatively great inertia connected to the rotating member of said motor, and means responsive to the load on said circuit for changing the actual speed of said motor relatively to the synchronous speed thereof when the load on the circuit changes.

13. In combination, an alternating current circuit, an induction motor connected across said circuit, a member of comparatively great inertia connected to the rotating member of said motor, and means responsive to the load on said circuit for changing the actual speed of said motor relatively to the synchronous speed thereof when the load on said circuit rises above a predetermined value.

Milwaukee, Wis., Sept. 9, 1910.

In testimony whereof I affix my signature, in the presence of two witnesses.

JOHN L. JOHNSON.

Witnesses:
  G. B. SCHLEY,
  CHAS. L. BYRON.